United States Patent [19]

Gaudillat

[11] Patent Number: 5,268,626
[45] Date of Patent: Dec. 7, 1993

[54] DIGITAL PROPORTIONAL INTEGRAL AND DERIVATIVE CONTROL SYSTEM

[75] Inventor: Jacques F. Gaudillat, Chatenoy en Bresse, France

[73] Assignee: Eastman Kodak Company, Rochester, N.Y.

[21] Appl. No.: 976,617

[22] Filed: Nov. 16, 1992

[30] Foreign Application Priority Data

Dec. 30, 1991 [FR] France ............... 91 16468

[51] Int. Cl.$^5$ .......................................... G05B 11/42
[52] U.S. Cl. .......................................... 318/610
[58] Field of Search ............... 318/596, 609, 610, 611; 364/162

[56] References Cited

U.S. PATENT DOCUMENTS

| | | | |
|---|---|---|---|
| 3,584,208 | 6/1971 | Slawson | 318/610 |
| 3,657,524 | 4/1972 | Bakke | 318/610 |
| 3,882,368 | 5/1975 | Carleton | 318/610 |
| 4,195,337 | 3/1980 | Bertrand et al. | 318/610 X |

*Primary Examiner*—Bentsu Ro
*Attorney, Agent, or Firm*—Clyde E. Bailey

[57] ABSTRACT

The invention relates to control and, more particularly, to digital control of the relative positioning of an inertia system in translation or rotation.

According to the invention, the position of the variable to be adjusted is defined digitally and this information is then processed to obtain the integral, to the first derivative and the second derivative. According to the invention, this second derivative is used to produce an automatic correction of the parameters to be applied to the integral, to the first derivative and to the position data in order to calculate the force or torque to be applied to the inertia system.

Use for the adjustment of translation or rotation movements.

5 Claims, 5 Drawing Sheets

DIGITAL PROPORTIONAL INTEGRAL AND DERIVATIVE CONTROL SYSTEM

FIELD OF INVENTION

The present invention relates to control and more particularly to an improvement to closed loop control systems.

BACKGROUND

The control systems generally used comprise control loops, optionally in cascades, to make it possible to regulate an intermediate quantity on which the influence of the perturbations shows itself more rapidly than on the principal quantity controlled.

Figure 1:
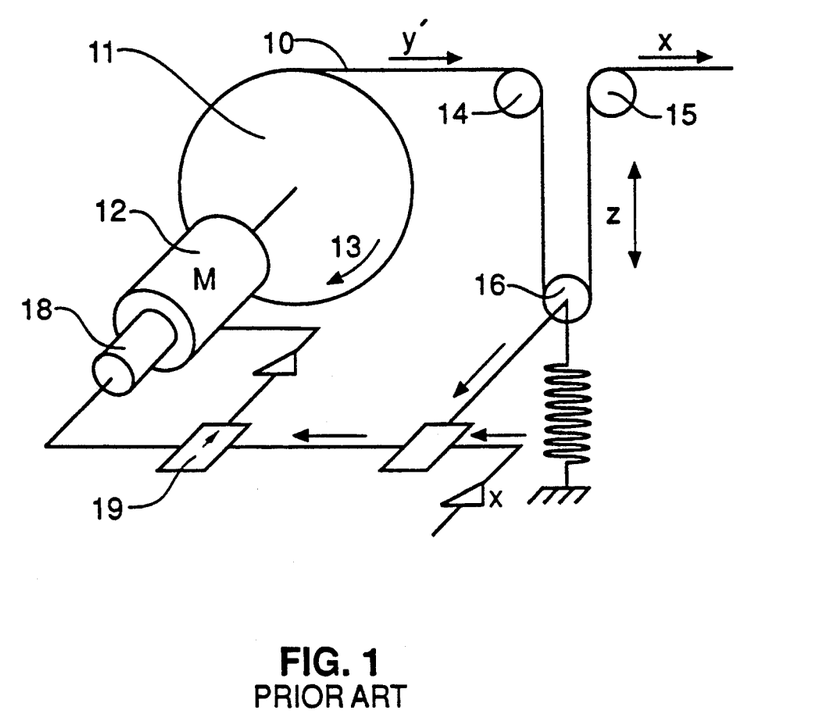
FIG. 1 shows diagrammatically a control circuit of the prior art.

It is well known that positioning systems having several loops in cascades can be used. FIG. 1 shows a device of the prior art making it possible to regulate the movement of a strip 10 wound on a roll 11 driven by a motor 12. The motor 12 drives the roll 11 in the direction of the arrow 13 so as to reel out the strip 10 at a speed dy/dt. The strip 10 supplies a machine (not shown) at a feed speed dx/dt. So as to be able to control the speed of rotation of the motor 12 as a function of the feed speed dx/dt of the strip into the machine (not shown), it is necessary to measure the variation in speed between the feed into the machine and the speed at which the strip is reeled out. In order to do this, three idler rollers 14, 15, 16 are used, enabling the direction of the strip to be changed. The roller 16 is drawn back by a spring 17, a weight, a jack, or any other similar component. The position of the roller 16 is a function of the difference between the feed speed dx/dt and the reeling-out speed dy/dt. Normally the speed of rotation $\Omega$ of the motor 12 is measured by means of a tachometer 18. The speed at which the reel should rotate is derived from the position of the roller 16. It is compared at 19 with the signals coming from the tachometer so as to derive from this an error signal which is sent to the motor 12.

Advantageously, PID devices with proportional, integral and derivative action well known in the art are used, which make it possible to obtain actions giving good stability whilst diminishing the transitory phases. However, the setting of the parameters of these PID devices is long and tedious since it is carried out by successive approximations and the actions on one of the parameters generally entail modification of the other parameters. These control chains are generally of analog type. However, the arrival on the market of digital PID devices, made possible by the current stage of development of electronics, now allows digital processing by means of analogue/digital converters.

SUMMARY OF INVENTION

The object of the invention is to provide a control method in which the settings are obtained systematically and without any empirical procedure, whatever the machine, ie independently of any small variations in friction or inertia in the components, either with respect to the theoretical value, or between two identical machines. The object is achieved by means of a method according to claim 1 in which:

a) the position to be controlled is defined digitally,
b) the data is processed in order to obtain the derivative and the integral, and
c) the force or torque to be applied to this inertia system is determined as a function of the solutions to the equation:

$$cm = -k(d.z' + p.z + \int z\, dt)$$

in which z represents the error measured, cm the torque applied to the inertia system, and k, d and p are factors applied respectively to the integral, the first derivative and the proportional value, and d) this torque or force is applied directly to the inertia system to be controlled, a method characterised in that:

e) the data is processed to obtain the second derivative of the error measured;
f) an automatic correction of the parameters to be applied to the integral, the first derivative and the position data is carried out in order to calculate the force or torque to be applied to the inertia system.

BRIEF DESCRIPTION OF THE DRAWINGS

In the accompanying drawing, given by way of example.

DETAILED DESCRIPTION

In order to understand the invention better, the theory will first of all be dealt with. It is well known that when it is desired to regulate a "positioning" system in which a component with inertia is moving, it is possible to act only through a force which produces an action on the second derivative. In the prior art, when it was desired to regulate a mechanical system driven by a motor, the difference in position between the actual position and the theoretical position was measured so as to determine from this a speed of rotation of the motor (the reference) which was compared with the actual speed in order to provide a correction signal. This mechanical system can be studied in the following manner.

Let J be the inertia of the mechanical system referred to the motor shaft, $\Omega$ the angular velocity of the motor, Cm the torque delivered by the motor and Cf the torque due to parasitic friction. It is well known that:

$$Cm - Cf = J\Omega' \quad (1)$$

in which $\Omega'$ is the first derivative of the angular velocity of the motor. In the movement of the part of the mechanical system, a movement providing the correction of an error, is termed y, and the ratio between $\Omega$ and the speed of this movement is termed $\alpha$, this gives the relationship $$\alpha y' = \Omega \quad (2)$$

in which y' is the first derivative of y. Replacing $\Omega'$ in relationship (1) by its value obtained from relationship (2) gives:

$$Cm - Cf = J\Omega' = Jay'' \quad (3)$$

in which y" is the second order derivative of y. If x is the error at the input and z the error measured at the output, the relationship existing between x, y and z is of the type:

$$y = \beta x + \tau z \quad (4)$$

in which $\beta$ and $\tau$ are constants.

For control purposes, the motor is provided with a torque which depends on the error measured. The control systems of the prior art showed that there was a certain advantage for the torque to depend not only on the value of the measured error u but also on its derivative and its integral (PID):

$$Cm = -k(du' + pu + \int udt)$$

where u can be the z error measured or more generally, as was mentioned above, the difference between the desired speed (the reference) and the actual speed (cascade control).

According to the invention, the velocity difference is no longer measured and the motor torque thus depends on the second derivative of the error z".

$$Cm = -k(diz' + pi2z + i3\int zdt) - az'' \quad (5)$$

in which:
k is the general gain;
(d.i) is the correction factor applied to the first derivative;
(p.i2) is the correction factor applied to the proportional reaction;
a is the correction factor applied to the acceleration;
i3 is an integral correction factor.

The advantage of i will be seen later. In the prior art this factor was equal to 1 and did not appear in the equations.

Differentiating relationship (4) twice gives $$y'' = \beta x'' + \tau z'' \quad (6)$$

Substituting relationships (5) and (6) in relationship (3) gives:

$$(a + Ja\tau)z'' + kdi\, z' + kpi2\, z + ki3\int zdt = -Cf - Ja\beta x''$$

Putting $K = k/(a + Ja\tau)$ and differentiating gives:

$$z''' + Kdi\, z'' + Kpi^2 z' + ki^3 z = \frac{-Ja\beta}{a + Ja\tau} x''' \quad (7)$$

The solution to equation (7) without the right-hand side, ie $$z''' + Kdi\, z'' + Kpi2\, z' + Ki3z = 0 \quad (8)$$

is of the form:

$$z = Z_1\, e^{z1\,t} + Z_2\, e^{z2\,t} + Z_3\, e^{z3\,t} \quad (9)$$

in which z1, z2 and z3 are complex numbers.

It is well known that if damping is desired, the real parts of z1, z2 and z3 must be negative. It can easily be demonstrated that this condition is fulfilled when:

K>0, d>0, p>0 and i>0 and (Kdi)(Kpi2)>Ki3 i.e.

Kdp>1

This condition is already known by the name of Routh's criterion but it is not sufficient to eliminate the transitory phase oscillations completely. The advantages inherent in the invention in having introduced the factor i can already be seen. In fact, this condition is independent of this factor.

If it is desired that the solutions to equation (8) should have no oscillation, it is necessary and sufficient for z1, z2 and z3 in equation (9) to be real and negative. If one of the solutions is made equal to $e^{z\circ t}$, by substituting its values in equation (8) and dividing by $e^{z\circ t}$, this gives:

$$zo^3 + Kdi\, zo^2 + Kpi2\, zo + Ki3 = 0 \quad (10)$$

The real roots of equation (10) are called z1, z2 and z3 where $z3 \leq z2 \leq z1 \leq 0$.

It will be recalled that the factors K, d, p and i are positive. Let us determine the conditions linking the factors so as to have real negative roots.

Figure 3A:
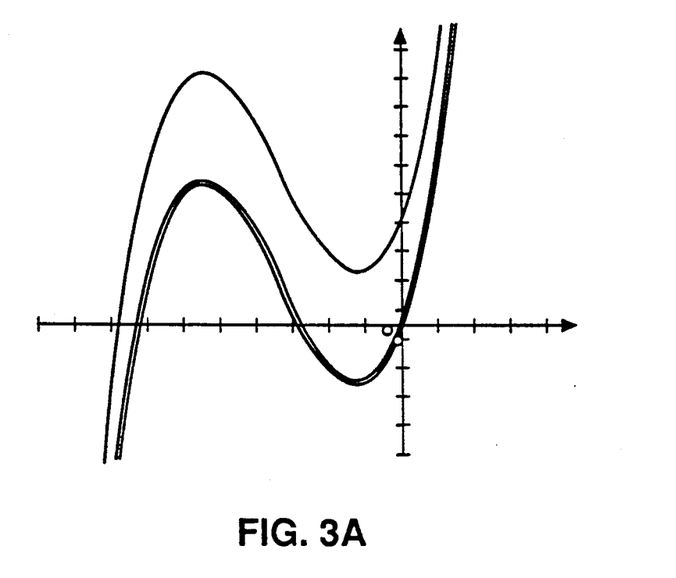
FIGS. 3A–3D show graphs enabling the conditions required for implementing the invention to be understood better.
Figure 3B:
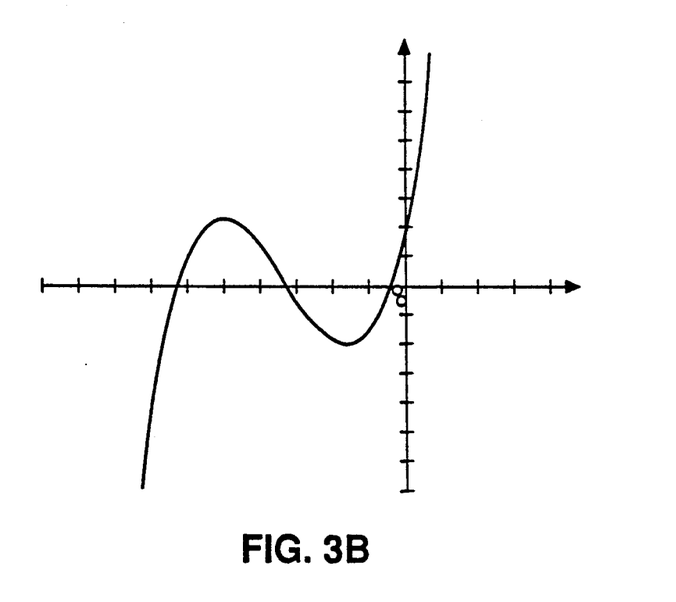

It will be noted that the value of the left-hand side of equation (10) gives a continuous third order curve between $-\infty$ and $+\infty$. Equation (10) therefore permits at least one real root. The value for z=0 is equal to Ki3, ie positive because of the conditions already mentioned with regard to the factors. If the curve is displaced by the amount -K i3, a curve is obtained similar to the one shown in a double line in FIG. 3A, and equation (10) becomes:

$$zo^3 + Kdi\, zo^2 + Kpi2\, zo = 0 \quad (11)$$

which permits the value 0 as a solution. For this equation to have two other real solutions, it is necessary that:

(Kdi)2 > 4 Kpi2 i.e.:

Kd2 > 4p (12)

When condition (12) is fulfilled, the z3 solution is real and negative whatever the positive value of Ki3.

Figure 3C:
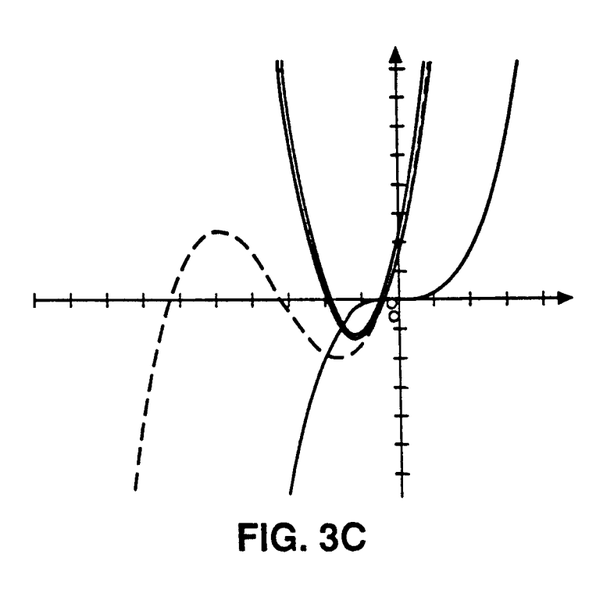

Let us now consider FIG. 3C. The curve provided by equation (10) can be considered to be the sum of a first function z3 and a second function Kdi zo2+Kpi2 zo +Ki3.

FIG. 3C shows in a continuous line (single and double) the two functions and in a broken line their sum which is the left-hand side of equation (10).

If we call the roots of the equation $$Kdi\, zo^2 + Kpi2zo + Ki3 = 0 \quad (13)$$

z4 and z5 it suffices that z4 should be real for z1 to exist, since z4 > z1 > 0.

For equation (13) to have real solutions, it suffices that:

(Kpi2)2 > 4 (Kdi)(Ki3)

i.e.

$$p^2 > 4d \quad (14)$$

When conditions (12) and (14) are satisfied, real negative roots z1 and z3 are obtained and therefore z2, which is between z1 and z3, is also real and negative.

If we take $K \geq 1$, condition (12) can be written:

$$d2 > 4p \qquad (15)$$

It can be demonstrated that if conditions (14) and (12) exist, they necessarily entail $Kpd > 1$.

Figure 3D:
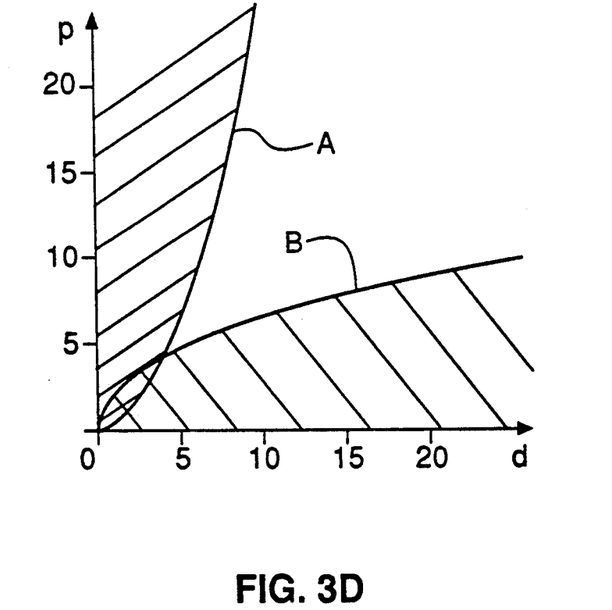

FIG. 3D shows the curve A of equation $p = d2/4$ and the curve B of equation $d = p2/4$, which are the conditions (14) and (15). In order to avoid oscillations, it suffices that the values of p and d should be within the non-hatched area in FIG. 3D. It will be noted that these two conditions are independent of the value of the correction factor i. This factor was introduced into equation (5) in such a way that it does not interfere with the stability conditions. It therefore makes it possible to adjust the "reaction" of the system as a function of time and, during the transitory phases, the equilibrium position is achieved more quickly as the value of i becomes greater. In addition, i can be a variable factor, controllable by any external parameters to suit the different requirements which can be conceived. For example, in the case of an umvinding, if it is desired to limit the acceleration of the moving cylinder so as not to create high excess tension in the web, i can be automatically adjusted by writing the condition: if $z'' > z''\max$ then $i = i - \delta i$ or, even better, $i = qi$ where $q < 1$. As indicated previously, K was made equal to $k/(a + J\alpha\tau)$ and $K \geq 1$, where k is the general gain, $\alpha$ and $\tau$ are constants and J the inertia of the system. It is well known that in order to avoid large accelerations which would impair the stability of the system, it is necessary to work with a moderate motor torque and use a low general gain k. When digital systems are used, idle times occur because the signals are sampled. This phenomenon causes errors. It has been found from experience that digital control of these systems could be achieved only if $1 \leq K \leq 2$. This therefore gives $k \simeq a + J\alpha\tau$ and when $J\alpha\tau$ is constant a zero value can be chosen for the factor a, which takes us back to the known art in which equation (5) does not involve the second derivative. However, when the inertia varies during operation, K varies between a minimum value and a maximum value. $J\alpha\tau$ varies between $(J\alpha\tau)$min and $(J\alpha\tau)$Max. Putting $k = a + (J\alpha\tau)$Max and $a = a0 \ (J\alpha\tau)$Max gives:

$K = 1$ when $J\alpha\tau$ is equal to its maximum value and $$K = \frac{a0 + 1}{a0 + (J\alpha\tau)\min / (J\alpha\tau)\text{Max}}$$

when $J\alpha\tau$ is minimum.

If a0 is made large, the variation in K can be made small. Putting $a0 = 2$ gives $1 \leq K < 1.5$ and $a0 = 5$ gives $1 \leq K < 1.2$.

Equation (7) has, up to now, been considered without the right-hand side. The solutions to equation (7) with the right-hand side are in the form of the solutions of the equation without the right-hand side plus a special solution, i.e.:

$$z = Z1 e^{z1t} + Z2 e^{z2t} + Z3 e^{z3t} + h(t)$$

in which h(t) is a function of the type $x'''$. If $x'''$ is zero, this reintroduces the equation without the right-hand side; if $x'''$ is a constant, h(t) is a constant which becomes smaller as a becomes larger, and if $x''' = Xo\epsilon 3 \min(\epsilon t)$, this gives $h(t) = Z5 \min(\epsilon t + \Phi)$, with Z5 becoming smaller as a becomes larger.

It can be seen therefore that the introduction of a correction proportional to the second derivative of the difference z 1) attenuates the effect of the variation in the inertia; 2) attenuates the effect of the perturbation due to the input error x; 3) allows an error in the determination of J. The latter effect provides the practical possibility of making an approximate calculation of the value of the inertia and determining an order of magnitude of the factors and parameters for implementing the invention.

Figure 4A:
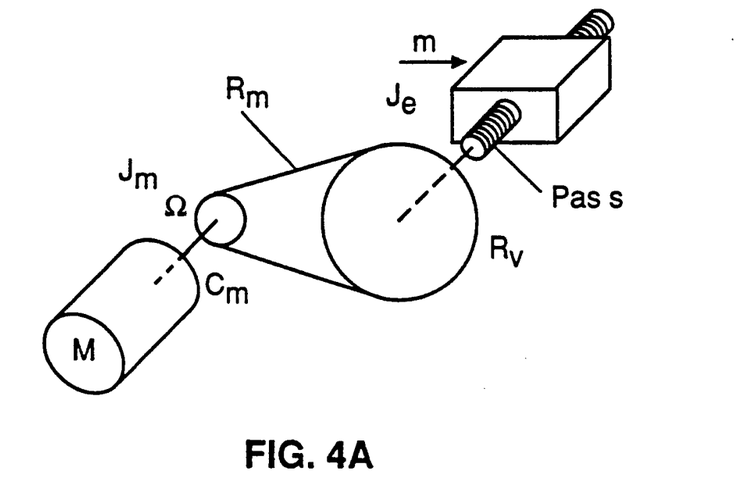
FIGS. 4A and 4B show diagrammatically the automatic centring of a width of material by means of a device according to the invention.
Figure 4B:
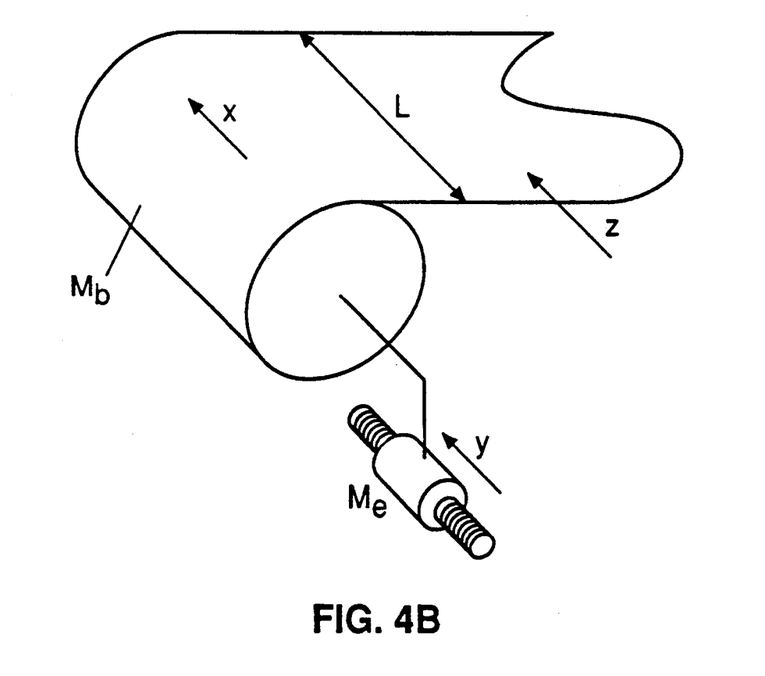

It will now be seen how the invention can be used for the automatic centring of a width of material. As can be seen from FIG. 4B, the movement z of the width of material is given by the relationship:

$$z = x + y \qquad (16)$$

in which x represents the movement of the reel with respect to the support and y the movement of the support. Comparing equations (16) and (4) gives $\tau = 1$ and $\beta = -1$. To control the centring of the width of material, it is necessary therefore to control the movement of a mass m which is equal to the sum of the mass of the mechanical assembly me supporting the reel and the mass of the reel mb $$m = mb + me \qquad (17)$$

If the density of the reel is $\rho$, the radius of the reel R and the width of the material $\epsilon$, this gives:

$$m = \pi R2 l \rho + me \qquad (18)$$

Consider the motor torque Cm which has to be controlled in order to move a mass m. In the example shown in FIG. 4A, Cm is in the form $$Cm = Cm1 + Cm2 + Cm3 \qquad (19)$$

in which Cm1 represents the torque used to move the mass m; Cm2 represents the motor torque used to rotate the assembly consisting of the screw with pitch s and pulley with radius Rscrew; Cm3 represents the motor torque used to rotate the pulley with radius Rmotor.

If the inertia of the motor fitted with the pulley of radius Rmotor is jm, then:

$$Cm3 = jm\Omega' \qquad (20)$$

If the inertia of the rotating assembly consisting of the screw with pitch s and the associated pulley with radius Rscrew is je, then:

$$Cm2 = je\Omega'/\mu 2 \qquad (21)$$

in which $\mu$ represents the reduction radio $$\mu = Rscrew/Rmotor \qquad (22)$$

The torque Cm1 utilized to move the mass m is calculated as follows. One rotation of the screw moves the mass m by the quantity s. One rotation of the motor moves this mass by the quantity $s/\mu$. If the angular velocity of the motor is called $\Omega$ this gives:

$$y' = \Omega s / 2\pi\mu \qquad (23)$$

Comparing equation (23) with equation (2) gives:

$$\alpha = 2\pi\mu/s \quad (24)$$

The force F used for the movement of the mass is given by the equation:

$$F = my'' \quad (25)$$

This therefore gives:

$$F = m\Omega's/2\pi\mu \quad (26)$$

The motor torque Cm1 may then be written as:

$$Cm1 = Fs/2\pi\mu = m\Omega'(s/2\pi\mu)2 \quad (27)$$

i.e.

$$Cm1 = m/\alpha 2 \quad (28)$$

The total motor torque is therefore $$Cm = \left(\frac{m}{\alpha^2} + \frac{je}{\mu^2} + jm\right)\Omega' = J\Omega' \quad (29)$$

in which J is the inertia referred back to the motor. The value of $J\alpha\tau$ is therefore:

$$J\alpha\tau = \frac{m}{\alpha} + \frac{\alpha je}{\mu^2} + \alpha jm \quad (30)$$

with m given by equation (18).

As indicated above, it can be seen therefore that an approximate value of the inertia referred back to the motor can be calculated and that introducing the second derivative of the difference makes it possible to calculate approximate values which can be used for the subsequent automatic control. The advantages of a and i exist only because the other coefficients k, p and d have been previously determined. (In fact, if the values of p and d are arbitrary or are adjusted empirically during the tests, the settings thus obtained will be suitable only for the values of i and a utilised at the time of these settings and will, therefore, no longer have their independence and the advantages mentioned.) The pre-determination of the values of k, d and p is possible only because of the demonstration of the two stability conditions (14) and (15) and the complete digital processing which alone makes it possible to be certain of the values introduced into the system. Consider another application of the invention with reference to FIG. 2; the unwinding or winding of a film from or onto a core.

Figure 2:
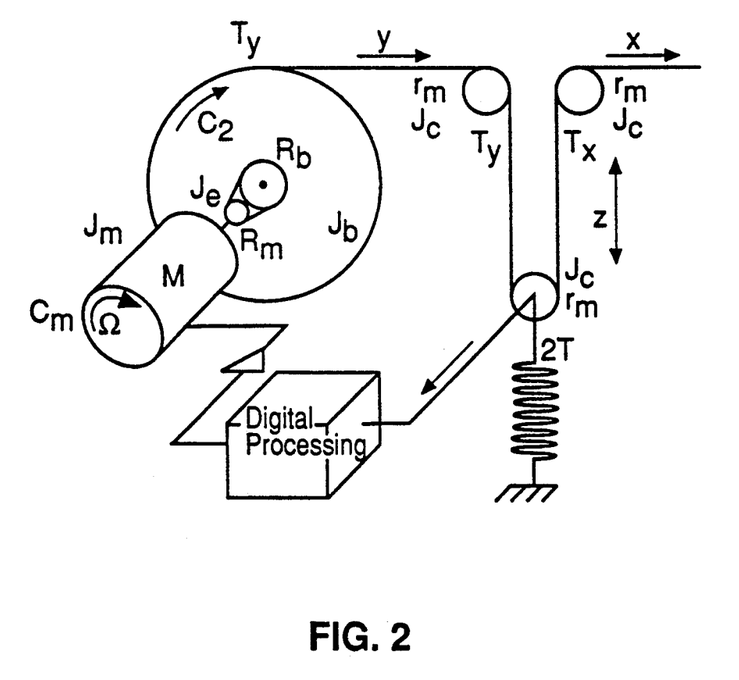
FIG. 2 shows diagrammatically a control circuit according to the invention for the same application.

As can be seen in FIG. 2, the movement z of the idler roller is given by the equation $$2z = y - x \quad (31)$$

Comparing this equation with equation (4) gives:

$$\beta = 1 \text{ and } \tau = 2$$

Designating the reduction ratio of the pulley drive system $\mu$, where $\mu = Rb/Rm$, and the angular velocity of the motor $\Omega$ it is possible to write:

$$y' = \Omega R/\mu \quad (32)$$

Comparing this equation with equation (2) gives $$\alpha = \mu/R.$$

To simplify the mathematics, it is assumed that the idler rollers are identical. Let m be the mass of each roller, jc their respective inertias, r their radius and 2T the restoring force exerted on the intermediate roller used to keep the film under tension. The tension Ty assisting the motor can be written in the form:

$$Ty = T - \frac{3}{2}\frac{jc}{r^2}x'' - \frac{z''}{2}\left(5\frac{jc}{r^2} + m\right) \quad (33)$$

The torque Cd available to drive the reel can be written:

$$Cd = \mu(Cm - jm\Omega')$$

in which jm represents the inertia of the motor carrying the drive pulley of radium Rm.

The torque enabling the film to be moved is represented by Ty R+Cd. This therefore gives:

$$TyR + Cd = y''(jb + je)/R = \frac{\Omega'}{\mu}(jb + je) \quad (34)$$

If Ty in equation (34) is replaced by its value calculated from equation (33), this gives, as the left-hand side:

$$TR - \frac{3R}{2}\frac{jc}{r^2}x'' - \frac{z''R}{2}\left(\frac{5jc}{r^2} + m\right) + \mu cm - \mu jm\,\Omega' \quad (35)$$

i.e.:

$$TR - \frac{3R}{2}\frac{jc}{r^2}x'' + \mu Cm = \quad (36)$$

$$\Omega'\left(\frac{jb}{\mu} + \frac{je}{\mu} + \mu jm\right) + z''\frac{R}{2}\cdot\left(\frac{5jc}{r^2} + m\right)$$

Differentiating equation (31) gives:

$$z'' = \frac{y''}{2} - \frac{x''}{2}$$

We therefore obtain from equation (36) and the differentiated equation (32)

$$y'' = (R/\mu)\Omega'\frac{TR}{\mu} + x''\frac{R}{4\mu}\left(m - \frac{jc}{r^2}\right) + Cm =$$

$$\Omega'\left[\frac{jb + je}{\mu^2} + jm + \frac{R^2}{4\mu^2}\left(\frac{5jc}{r^2} + m\right)\right]$$

From this, therefore:

$$J = \frac{jb + je}{\mu^2} + jm + \frac{R^2}{4\mu^2}\left(\frac{5jc}{r^2} + m\right)$$

The value of $J\alpha\tau$ becomes $$J\alpha\tau = \frac{2jb}{\mu R} + \frac{2je}{\mu R} + \frac{2\mu jm}{R} + \frac{R}{2\mu}\left(\frac{5jc + m}{r^2}\right)$$

where $jb = Mr2/2 = \pi\rho lR4/2$

As indicated above, it can therefore be seen, here again, that it is possible to estimate an approximate value of the inertia, referred back to the motor, which enables the invention to be implemented. Once an approximation of the inertia referred back to the motor has been determined, the invention can be dealt with in a well-known digital manner.

It is well known that the transformation of analogue values can be obtained only by means of discreet values. If the sampling frequency in seconds is N:

$$N = 1/\delta t \quad (39)$$

The relationships given above were written in the MKSA standard system of units. When the measured values are transposed by numerical values, the values thus obtained do not represent the distance in meters m, the speed in m/s or rad/s but in other units, and it is therefore necessary to calculate transposition factors. By definition, capital letters will be used to represent the numerical values. For example Z is the numerical value representing the difference (z in meters). Let Zo be the number of positions which can be determined for a given difference of 1m. It can be said that z in meters is equal to:

$$z = Z/Zo \quad (40)$$

If z(t) is the measurement of z at time t, this gives the velocity in m/s.
$s' = [z(t) - z(t-\delta t)]/[t - (t-\delta t)] = [z(t) - z(t-\delta t)]/\delta t$ ie:

$$z' = \frac{N}{Zo}(Z(t) - Z(t - \delta t)) = \frac{N}{Zo}[Z(t) - Z(t - 1/n)] \quad (41)$$

Likewise the acceleration in m/s2.

$$z'' = \frac{N^2}{Zo}(\delta(\delta z))$$

$$z'' = \frac{N^2}{Zo}[Z(t) - 2Z(t - 1/N) + Z(t - 2/N)] \quad (42)$$

and the integral $$\int z dt = \frac{1}{NZo}[\Sigma Z(t)] \quad (43)$$

If Co is the maximum torque exerted by the motor when the digital/analogue transmitter controlling the motor amplifier is at its maximum, Eo the maximum number of possible points which can be accepted ;by the transmitter and E the numerical value generated by the calculations and supplied to the transmitter, it is possible to put:

$$Cm = Co\left(\frac{2E - Eo}{Eo}\right) \quad (44)$$

Thus the motor torque Cm takes its maximum positive or negative value for E=0 or E=Eo and takes a zero value for E=Eo/2.

Equation (44) can also be written:

$$E = \frac{Eo}{2}\left(\frac{Co + Cm}{Co}\right) = \frac{Eo}{2}\left(1 + \frac{Cm}{Co}\right) \quad (45)$$

The digital/analogue transmitter controlling the motor can therefore be supplied with a value of E such that:

$$E = \frac{Eo}{2} - \quad (46)$$

$$\frac{k \cdot Eo}{2CoZo}\left[d \cdot i \cdot N(\delta Z) + p \cdot i^2 \cdot Z + \frac{i3}{N}\Sigma Z + \frac{aN^2}{k}\delta(\delta Z)\right]$$

It will be noted that, because this is carried out digitally, the variations of $\int z dt$, z, z' and z" take place by successive increments with the respective values 1/NZo, 1/Zo, N/Zo, N2/Zo. None of these increments must generate an excessively large relative variation in the torque. It has been found experimentally that a satisfactory function was obtained when:

$$\frac{ki3}{N\,Co\,Zo} \leq 0{,}15 \quad (47)$$

$$\frac{kpi^2}{Co\,Zo} \leq 0{,}15 \quad (48)$$

$$\frac{kdi\,N}{Co\,Zo} \leq 0{,}07 \quad (49)$$

and $$\frac{a\,N^2}{Co\,Zo} \leq 0{,}01 \quad (50)$$

It is obvious that in order to avoid perturbations due to idle time, the sampling frequency N must be sufficiently large. In practice $N \geq 50$. In these circumstances, the first three conditions (47), (48), (49) are generally easily met. However, condition (50) is more difficult to achieve. Where this condition is not achieved, it is nevertheless possible to use the invention by cancelling the value of the factor a and by using the value of the second derivative for automatically adjusting the factor k. For example, when there is any uncertainty about the value of $J\alpha\tau$, the procedure is started with k N $J\alpha\tau$ and the ideal gain k is sought by writing the condition with a constant i. When the acceleration is too large the gain is decreased, verifying the following condition:

$$\text{If } z'' > z''\text{max then } \delta(\delta Z) > \frac{Zo}{N^2} z''\text{max.}$$

When this condition is achieved, the value of k will be modified to take $k - \delta k$ or, better still, qk with $q < 1$. It is obvious that this search can be speeded up by writing several conditions of the same type:

If $z'' < 2\, z''$max then $k = k - 2\,\delta k$, etc.

When $J\alpha\tau$ is decreasing, which is the case for example with an unwinding device, it is possible to proceed as indicated above, but each cycle will be started off with a value of k equal to the value $(J\alpha\tau)$max.

In these two cases the gain is adjustable automatically, which is easy because of the digital processing. When $J\alpha\tau$ is increasing, which is the case for example with a winding machine, and this increase takes place in accordance with a known law, for example the variation in a length of film, k can be made to vary approximately in accordance with the inertia variation law. It is sufficient for this variation to be identical, within 25%, to the variation in inertia. In this case the variation in the factor i will be used, as in the general case described above, to vary the control, and the condition indicated will be used:

$$\text{If } z'' > z''\text{max} \quad \text{then} \quad i = i - \delta i$$
$$\text{or} \quad i = qi \text{ with } q < 1$$

The advantage of the invention lies essentially in the fact that stability conditions (14) and (15) were discovered which up until then were unknown and that the use of an additional parameter independent of the stability conditions makes it possible to mitigate the approximations necessary for the calculation of the system.

I claim:

1. A method of controlling the relative positioning of an inertia system in translation or rotation, the method comprising the steps of:
   (a) defining a difference between the theoretical and the actual positions of the inertia system using digital data;
   (b) obtaining the integral, and the first and second derivatives of such digital data;
   (c) applying a force or torque to the inertia system such that said force or torque is given by the equation $Cm = -k(d \cdot i \cdot z' + p \cdot i^2 \cdot z + i^3 \cdot \int z dt) - az''$ in which "Cm" is the torque applied; "K" is a general gain factor; "z" is a measured error between actual and related theoretical positions of the inertia system; "i" is a factor whose value does not influence stability conditions of the inertia system; "d·i" is a correction factor applied to the first derivative z'; "p·i²[2]" is a correction factor applied to a proportional reaction of the system; "a" is a correction factor applied to the second derivative z" of the error; and "i³[3]" is a correction factor applied to the integral of z.

2. The method according to claim 1 wherein the correction factor elements k, d and p are positive; the product Kdp is greater than 1·0; Kd² > 4p; and p² > 4d.

3. The method according to claim 2 wherein K is equal to K/(α+J∝τ) in which "J" is the inertia of the system referred back to the motor of the system; "∝" is a ratio between the speed Ω of the motor and a first derivative "Y'" of the error correcting movement of the system; and τ is a constant.

4. The method of claim 3 in which "K" is greater than 1·0; d² > 4p; and p² > 4d.

5. The method of claim 4 wherein the value of the factor "K" is adjusted automatically and responsively to the value of the second derivative z" of the measured error.

* * * * *